United States Patent
Shimizu (10) Patent No.: US 10,416,285 B2
(45) Date of Patent: Sep. 17, 2019

(54) OBJECT DETECTION APPARATUS CHANGING CONTENT OF PROCESSES DEPENDING ON FEATURE OF OBJECT TO BE DETECTED

(71) Applicant: DENSO CORPORATION, Kariya, Aichi-pref. (JP)

(72) Inventor: Koji Shimizu, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 213 days.

(21) Appl. No.: 15/326,293

(22) PCT Filed: Jul. 15, 2015

(86) PCT No.: PCT/JP2015/070310
§ 371 (c)(1),
(2) Date: Jan. 13, 2017

(87) PCT Pub. No.: WO2016/010087
PCT Pub. Date: Jan. 21, 2016

(65) Prior Publication Data
US 2017/0205494 A1    Jul. 20, 2017

(30) Foreign Application Priority Data
Jul. 16, 2014   (JP) .............................. 2014-145976

(51) Int. Cl.
*G01S 7/35*          (2006.01)
*G01S 13/34*         (2006.01)
(Continued)

(52) U.S. Cl.
CPC .............. *G01S 7/354* (2013.01); *G01S 7/411* (2013.01); *G01S 7/415* (2013.01); *G01S 13/34* (2013.01);
(Continued)

(58) Field of Classification Search
CPC ...... G01S 7/354; G01S 2007/356; G01S 7/41; G01S 7/411; G01S 7/414; G01S 13/24; G01S 13/241; G01S 13/931
See application file for complete search history.

(56) References Cited

U.S. PATENT DOCUMENTS 4,339,754 A * 7/1982 Hammers ............... G01S 13/52
                                                342/16
5,499,030 A * 3/1996 Wicks ..................... G01S 7/292
                                                342/159
(Continued)

FOREIGN PATENT DOCUMENTS

JP       2009-014405 A     1/2009

*Primary Examiner* — Peter M Bythrow
(74) *Attorney, Agent, or Firm* — Knobbe, Martens, Olson & Bear, LLP (57) ABSTRACT

The object detection apparatus is provided with a signal processing unit and an object detection unit. The signal processing unit performs a frequency analysis of a beat signal obtained by transmitting and receiving continuous waves and estimates an incoming direction of reception waves, the object detection unit executes, based on a processing result of the signal processing unit, at least an extracting process of an object candidate, a tracking process for an object and the object candidate, and an object recognition process that recognizes the object candidate to be the object.

The object detection unit is characterized in that the unit executes, individually for each type of object to be detected, the extracting process, the tracking process and the object recognition process, and changes content of processes depending on a feature of the object to be detected.

9 Claims, 5 Drawing Sheets

(51) Int. Cl.
  *G01S 7/41* (2006.01)
  *G01S 13/93* (2006.01)
  *G08G 1/16* (2006.01)
  *G01S 7/28* (2006.01)

(52) U.S. Cl.
  CPC .......... *G01S 13/341* (2013.01); *G01S 13/931* (2013.01); *G08G 1/163* (2013.01); *G08G 1/166* (2013.01); *G01S 7/2813* (2013.01); *G01S 2007/356* (2013.01)

(56) References Cited

U.S. PATENT DOCUMENTS

| | | | | |
|---|---|---|---|---|
| 5,594,451 A * | 1/1997 | Krikorian | | G01S 7/414 342/160 |
| 5,644,315 A * | 7/1997 | Long | | G01S 7/2927 342/101 |
| 5,691,724 A * | 11/1997 | Aker | | G01S 7/003 342/104 |
| 5,798,728 A * | 8/1998 | Tomishima | | G01S 7/2927 342/159 |
| 7,741,992 B2 * | 6/2010 | Wang | | G01S 13/5248 342/101 |
| 8,013,781 B2 * | 9/2011 | Stockmann | | G01S 13/5248 342/159 |
| 8,468,111 B1 * | 6/2013 | Tgavalekos | | G01S 7/003 706/45 |
| 8,730,090 B2 * | 5/2014 | Nakahama | | G01S 7/295 342/90 |
| 8,779,969 B2 * | 7/2014 | Shimizu | | G01S 7/412 342/106 |
| 8,816,900 B2 * | 8/2014 | Hasegawa | | G01S 13/34 342/174 |
| 8,976,058 B2 * | 3/2015 | Mizutani | | G01S 7/4026 342/70 |
| 9,134,409 B2 * | 9/2015 | Mizutani | | G01S 7/4026 |
| 9,157,992 B2 * | 10/2015 | Wang | | G01S 13/0218 |
| 9,310,468 B2 * | 4/2016 | Arage | | G01S 7/02 |
| 9,399,397 B2 * | 7/2016 | Mizutani | | B60K 31/00 |
| 2003/0174054 A1 * | 9/2003 | Shimomura | | G01S 7/415 340/435 |
| 2004/0090359 A1 * | 5/2004 | McMakin | | G01S 7/20 342/22 |
| 2004/0119634 A1 * | 6/2004 | Samukawa | | G01S 17/936 342/70 |
| 2004/0246169 A1 * | 12/2004 | Nakano | | G01S 7/412 342/70 |
| 2006/0139204 A1 * | 6/2006 | Abe | | G01S 13/931 342/52 |
| 2008/0089557 A1 * | 4/2008 | Iwaki | | G01C 3/06 382/106 |
| 2010/0073218 A1 * | 3/2010 | Stockmann | | G01S 7/2923 342/146 |
| 2010/0109938 A1 * | 5/2010 | Oswald | | G01S 7/2926 342/90 |
| 2016/0003939 A1 * | 1/2016 | Stainvas Olshansky | | G01S 13/02 342/146 |

* cited by examiner

UPPER-LOWER POWER DIFFERENCE FOR PEDESTRIAN

○ VEHICLE HORIZONTAL FILTER

✕ PEDESTRIAN HORIZONTAL FILTER

OBJECT DETECTION APPARATUS CHANGING CONTENT OF PROCESSES DEPENDING ON FEATURE OF OBJECT TO BE DETECTED

CROSS-REFERENCE TO RELATED APPLICATION

This application is based on and claims the benefit of priority from earlier Japanese Patent Application No. 2014-145976 filed Jul. 16, 2014, the description of which is incorporated herein by reference.

BACKGROUND OF THE INVENTION

Technical Field

The present disclosure relates to a radar technique, and particularly relates to a technique of detecting an object based on a beat signal acquired by transmitting and receiving continuous waves.

Background

A technique of detecting an object using a radar technique has been known. For example, JP-A-2009-14405 discloses a technique in which an on-vehicle radar device detects various objects (e.g., vehicles, pedestrians, roadside objects) existing around the vehicle, and the objects detected are utilized by various driving support systems such as pre-crash safety (PCS) and adaptive cruise control (ACC).

For example, in a FMCW radar apparatus, fast Fourier transformation (FFT) is performed for a beat signal generated from transmission/reception waves to extract a peak signal component in the FFT result, whereby a distance to an object that reflects radar waves, a relative speed and an incoming direction of the reflected waves can be obtained. Further, processes such as a tracking process and a segmentation process are performed. The tracking process tracks an object in a time series manner, and the segmentation process segments parameters estimated in accordance with the same object. As a result, type of the object is recognized based on information (e.g., location, speed, size) of each object obtained through the above-mentioned processes.

CITATION LIST

Patent Literature

[PTL 1] JP-A-2009-14405

The detection result of the object is utilized in the above-mentioned various driving support systems. However, objects required to be detected are sometimes different depending on the systems.

For example, in the ACC system, it is required to detect a road-side object, a preceding vehicle and a cutting-in vehicle. Hence, objects existing in a running direction of the own vehicle have to be considered in a range from around the own vehicle to relatively distant area. In the PCS system, a pedestrian and a bicycle or the like have to be detected separately from a preceding vehicle and a cutting-in vehicle. Hence, an area close to the own vehicle has to be considered through a wide-angle range thereof. Thus, an object to be detected and an area which has to be considered become different, depending on the systems. Moreover, depending on type of the object, a size, behavior, and reflection intensity are different from each other.

Accordingly, there has been a problem that detection accuracy is difficult to be improved simultaneously for all of the different target objects (vehicle, pedestrian, roadside objects or the like).

Also, the systems have various requirements to detect objects so that all of peaks have to be extracted from the FFT results without any missing peaks, corresponding to possible candidates of various objects, to satisfy the various requirements. As a result, there is a concern that the number of peaks to be processed increases, and also the criteria for extracting peaks is lowered, so that peaks are likely to be mis-extracted because of noise, wastefully increasing the processing load.

SUMMARY

Hence, it is desired to provide a technique of simultaneously improving detection accuracy of various objects.

The object detection apparatus according to the present disclosure is provided with a signal processing unit and an object detection unit. The signal processing unit performs a frequency analysis of a beat signal obtained by transmitting and receiving continuous waves and estimates an incoming direction of reception waves. The object detection unit executes, based on a processing result of the signal processing unit, at least an extracting process of an object candidate, a tracking process for an object and the object candidate, and an object recognition process that recognizes the object candidate to be the object. The object detection unit is characterized in that the unit executes, individually for each type of object to be detected, the extracting process, the tracking process and the object recognition process, and changes the content of these processes depending on a feature of the object to be detected.

According to such a configuration, unnecessary object candidates can be prevented from being extracted and a tracking and object extracting can be accomplished depending on features of the object to be detected. Hence, the detection accuracy of all types of objects can be simultaneously improved.

It should be noted that reference numbers applied in the claims represent a correspondence between elements and specific means described in the embodiments which will be described later as one aspect, and do not limit the technical scope of the present disclosure.

DETAILED DESCRIPTION OF PREFERRED EMBODIMENTS

Hereinafter, with reference to the drawings, embodiments to which the present disclosure is applied will be described.

[Overall Configuration]

Figure 1:
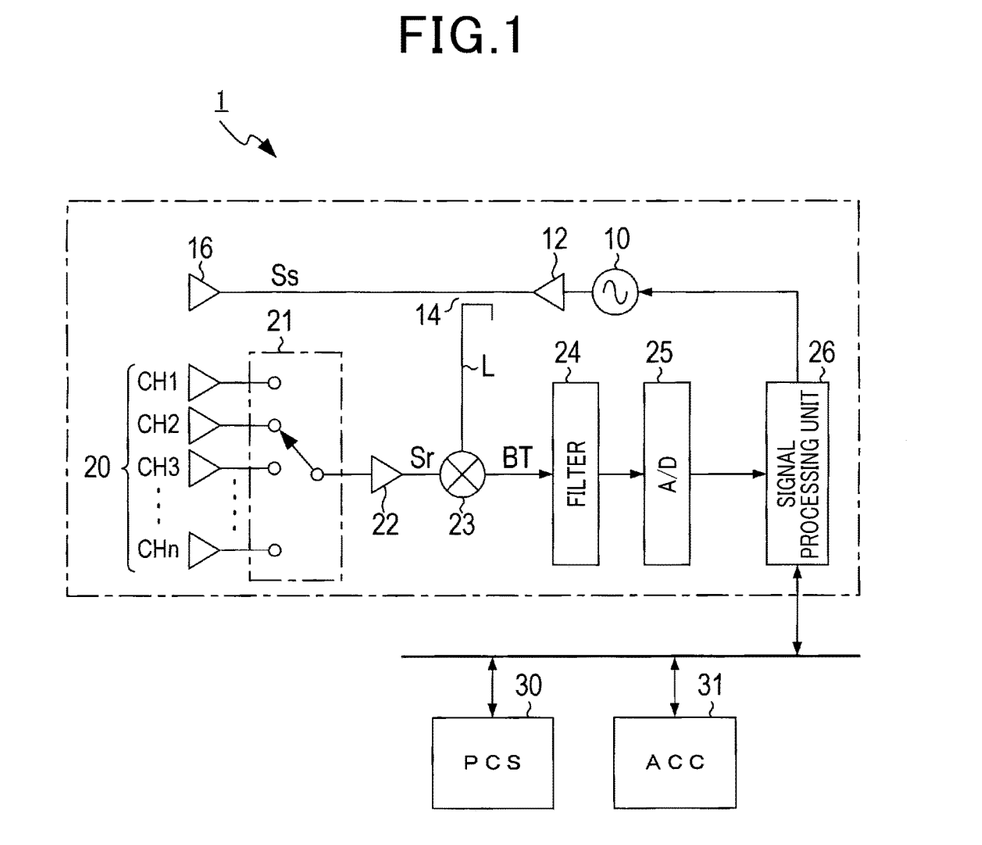
FIG. 1 is an overall configuration of an on-vehicle system.

The on-vehicle system shown in FIG. 1 is provided with a radar apparatus 1, a PCSECU 30 and an ACCECU 31. These radar apparatus 1, the PCSECU 30 and the ACCECU 31 are mutually connected via CAN (controller area network).

The PCSECU 30 executes a control process of a so-called pre-crash safety system (PCS). Specifically, when it is determined, based on information about obstacles existing around the vehicle supplied via the CAN, that a collision is unavoidable between the own vehicle and an obstacle existing on a running direction of the own vehicle, the PCSECU executes a control that enhances a braking force or a constraint force of a seat belt in the own vehicle, or a control that activates air bags (not shown), thereby mitigating impact of the collision.

The ACCECU 31 executes a control of so-called adaptive cruise control (ACC). Specifically, the ACCECU 31 executes a control that maintains, based on the information about a preceding vehicle supplied by the radar apparatus 1 via the CAN, an appropriate inter-vehicle distance between the own vehicle and the preceding vehicle The on-vehicle system is not limited to the PCS or ACC and may be configured to perform other known driving support control.

[Radar Apparatus]

The radar apparatus 1 is configured as an FMCW radar in which frequency modulated continuous waves of millimeter-wave band are transmitted as radar waves, and the radar waves reflected by objects (reflected waves) are received, thereby detecting the object. Hereinafter, a vehicle on which the radar apparatus 1 is mounted is referred to as an own vehicle. The radar apparatus 1 is disposed on a front face of the own vehicle so as to radiate the main beam of the radar waves in a running direction of the own vehicle.

The radar apparatus 1 is provided with an oscillator 10, an amplifier 12, a distributor 14 and a transmission antenna 16. The oscillator 10 generates a modulated high frequency signal in millimeter-wave band. The modulated high frequency signal is modulated to have a modulation period comprising an ascending section where the frequency linearly increases with time (gradual increase), and a descending section where the frequency linearly decreases (gradual decrease). The distributor 14 distributes power at the output of the amplifier 12 into a transmission signal Ss and a local signal L. The transmission antenna 16 radiates radar waves corresponding to the transmission signal Ss.

Further, the radar apparatus 1 is provided with a reception antenna unit 20, a reception switch 21, an amplifier 22, a mixer 23, a filter 24, an A/D converter 25, and a signal processing unit 26. The reception antenna unit 20 includes n number (n is two or more natural number) of antennas each receiving radar waves. The antenna is arranged in a vehicle-width direction of the own vehicle. The channels CH1 to CHn are assigned to respective antennas. The reception switch 21 successively selects each antenna of the n antennas composing the reception antenna unit 20, and supplies reception signal Sr from the selected antenna to subsequent stage. The mixer 23 mixes the reception signal Sr amplified by the amplifier 22 with the local signal L, thereby generating a beat signal BT representing a frequency-difference between the transmission signal Ss and the reception signal Sr. The filer 24 removes unnecessary signal component from the beat signal generated by the mixer 23. The A/D converter 25 samples the output of the filter 24 to convert the output thereof into digital data.

The signal processing unit 26 is mainly configured of a microcomputer including ROM, RAM and CPU, and provided with an arithmetic processing unit (e.g., DSP) used for executing high speed Fourier transformation (FFT) or the like. The signal processing unit 26 controls activation/deactivation of the oscillator 10, and sampling of the beat signal BT via the A/D converter 25. The signal processing unit 26 is connected to the PCSECU 30 and the ACCECU 31 via the CAN. The signal processing unit 26 executes an object detection process in which necessary information about objects (hereinafter referred to as object information) for various driving support controls is generated based on the sampling data, and transmits the information via the CAN. A processing program is stored in the ROM of the signal processing unit 26. The processing program enables the signal processing unit 26 to execute the object detection process.

[Overall Operation of Radar Apparatus]

According to the radar apparatus 1, in accordance with a command from the signal processing unit 26, the oscillator 10 generates a frequency-modulated high frequency signal, and the amplifier 12 amplifies the high frequency signal. The distributor 14 distributes power of the amplified high frequency signal whereby the transmission signal Ss and the local signal L. In accordance with the transmission signal Ss among these signals, the transmission antenna 16 radiates radar waves.

The radar waves radiated from the transmission antenna 16 and reflected at objects (i.e., reflected waves) is received by all of the antennas composing the reception antenna unit 20. The amplifier 22 amplifies only the reception signal Sr corresponding to the reception channel Chi (i=1 to n) selected by the reception switch 21.Thereafter, the reception signal is supplied to the mixer 23. The mixer 23 mixes the reception signal Sr with the local signal L from the distributor 14 to generate the beat signal BT. The filter 24 removes unnecessary signal component from the beat signal BT. Then, the beat signal BT is sampled by the A/D converter 25 and acquired by the signal processing unit 26.

The reception switch 21 is switched in a modulation period of the radar waves such that all channels CH1 to CHn are selected for a predetermined number of times (e.g., 512 times). The A/D converter 25 executes a sampling synchronizing to the switching timing of the reception switch 21. In other words, during one modulation period of the radar waves, sampling data is stored for every channel CH 1 to Chn and for every ascending and descending section of the radar waves The signal processing unit 26 detects an object that reflects the radar waves based on the sampling value of the beat signal BT, generates information about objects (position, speed, type of object), and outputs the information to the PCSECU 30 or ACCECU 31 via the CAN.

[Object Detection Process]

Figure 2:
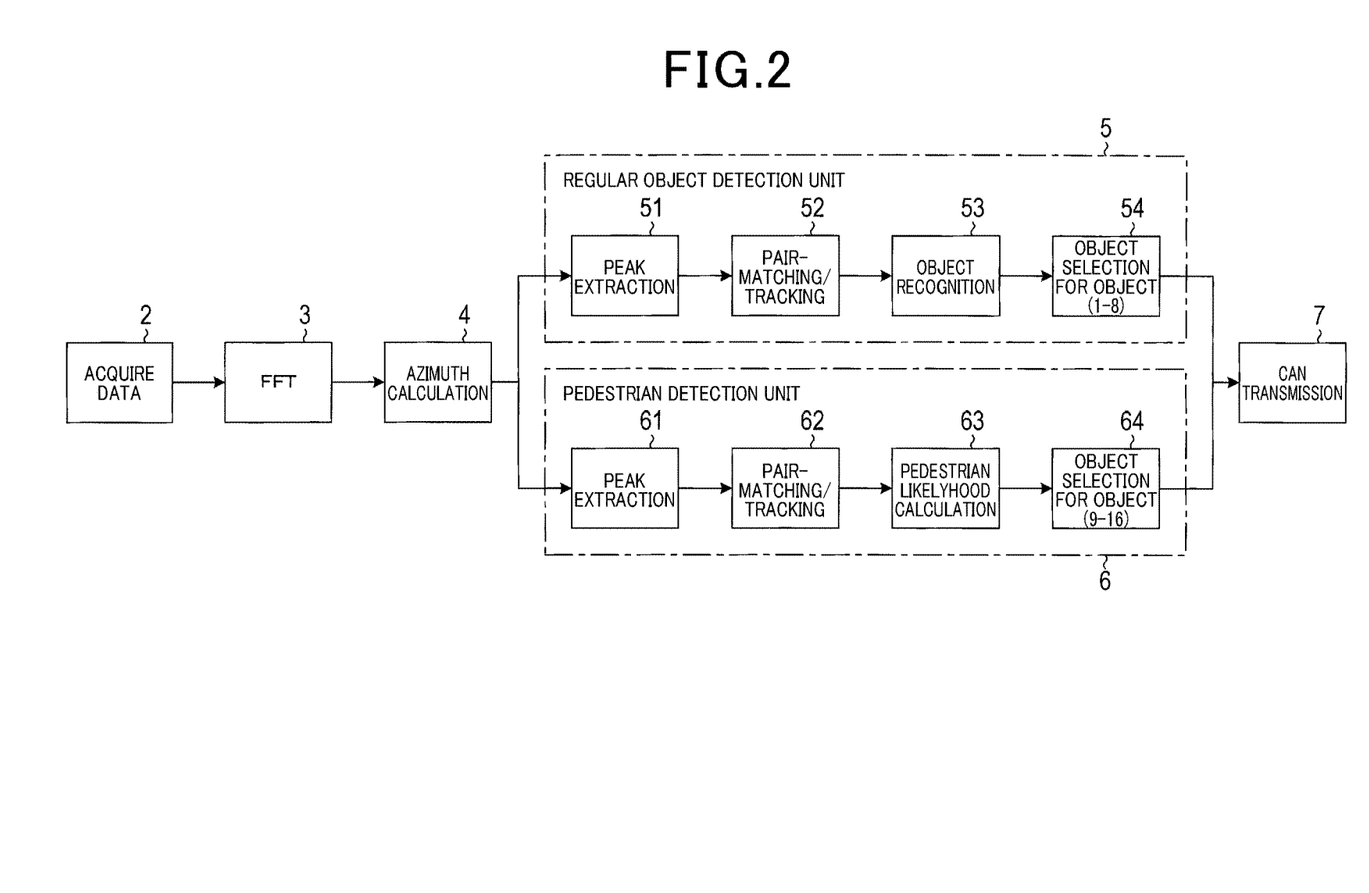
FIG. 2 is a functional block diagram showing content of an object detection process executed by a signal processing unit.

Next, with reference to the functional block diagram shown in FIG. 2, an object detection process executed by the signal processing unit 26 will be described. The signal processing unit 26 repeatedly executes the following processes at a measurement cycle which is one modulation period of radar waves. It should be noted that processes executed by functional blocks are accomplished by software as an example. However, all of functions or part of functions may be accomplished by hardware such as logic circuits.

The signal processing unit 26 is provided with a data acquiring unit 2, a FFT unit 3, an azimuth calculation unit 4, a regular object detection unit 5, a pedestrian detection unit 6, and a CAN transmission unit 7.

The data acquiring unit 2 acquires, at the measurement cycle, a sampling data for one modulation period stored in the previous measurement period.

The FFT unit 3 executes a frequency analysis process (FFT in this process) for the sampling data acquired by the data acquiring unit 2.and calculates a power spectral of the beat signal BT for every channel of CH1 to Chn and every ascending and descending section.

The azimuth calculation unit 4 performs, based on the calculation result (power spectrum) of the FFT unit 3, a frequency analysis process (e.g., super resolution method such as MUSIC, or digital beam forming) for signal components of n number of identical frequency bins collected from respective channels CH1 to CHn, thereby estimating the incoming direction of the signal components included in the frequency bins.

The regular object detection unit 5 detects regular objects (e.g., vehicle and roadside object) excluding pedestrians existing around the vehicle, in accordance with a calculation result of the FFT unit 3 and the azimuth calculation unit 4, and generates object information about maximum 8 numbers of regular objects selected in accordance with a predetermined criteria.

The pedestrian detection unit 6 detects pedestrians existing around the vehicle in accordance with a calculation result of the FFT unit 3 and the azimuth calculation unit 4, and generates object information about objects representing maximum 8 numbers of pedestrians selected in accordance with a predetermined criteria.

The CAN transmission unit 7 transmits the object information about total 16 objects (vehicles and pedestrians) to other PCSECU 30 and the ACCECU 31 via the CAN, the object information being generated by the regular object detection unit 5 and the pedestrian detection unit 6. At this time, each of the CAN frames transmitting various object information has unique ID assigned thereto. ECUs which use these object information refer the ID and acquires only the necessary object information.

The object information (regular object) generated by the regular object detection unit 5 is used for, for example, ACC or PCS. The object information (pedestrian) generated by the pedestrian detection unit 6 is used for, for example, PCS.

<Regular Object Detection Unit>

The regular object detection unit 5 is provided with a peak extracting unit 51, a pair match/tracking unit 52, an object extracting unit 53, and an object selecting unit 54.

The peak extracting unit 51 extracts a signal component (hereinafter referred to as peak component) representing a peak value in the power spectrum calculated by the FFT unit 3. The peak component is extracted by using a predetermined regular object threshold such that a peak component having a reception power exceeding the regular object threshold is extracted.

The pair match/tracking unit 52 determines any combination of a peak component of the ascending section and a peak component of the descending section extracted by the peak extracting unit 51 to be a peak pair, and extracts the combination of the peak components as a candidate pair (object candidate), in which both peak components satisfy a predetermined pair-match condition. The pair-match condition includes a condition that incoming directions of both peak components are almost the same, a condition that a power difference (refer to FIG. 4A) of both peak components is within a predetermined power difference range, a condition that a frequency difference between both peak components is within a frequency difference corresponding to a predetermined upper limit of the relative speed.

The pair match/tracking unit 52 further executes a tracking process for the extracted candidate pair. The tracking process determines, when a candidate pair extracted in the current measurement cycle exists in a predetermined allowable connection range with respect to a location of a decided pair (described later) or a candidate pair which had been extracted in the previous measurement cycle, that there is a history connection between the previous decided pair or the previous candidate pair, and the current candidate pair. At this time, information of the previous pair having a history connection is taken over to the current pair. It should be noted that a well-known process is used for such a tracking process.

The object extracting unit 53 determines a candidate pair having a history connection for a predetermined cycle or more to be a decided pair, and makes decided pairs having close speeds and locations to be segmented. Then, the object extracting unit 53 determines respective segments composed of a single or a plurality of decided pairs to be objects, and acquires information (location, speed, size and attribute) about the objects. When acquiring the locations of the objects, a horizontal position filter is used to minimize fluctuation of the horizontal position utilizing a past detection result. The attribute is information that determines, based on other object information, whether or not the object is a roadside object such as guardrail, curbstone, vehicle, and obstacle other than vehicle.

The object selecting unit 54 estimates the traffic lane where the own vehicle is currently running based on an object determined as a roadside object in the object extracting unit 53. Then, the object selecting unit 54 applies, based on a positional relationship between the object and the estimated traffic lane, a priority value to each object such that the higher the probability of an object existing on a lane where the own vehicle is running, the higher the priority value. The object information about 8 objects is selected in the order of higher priority value. <Pedestrian Recognition Unit>

The pedestrian detection unit 6 is provided with a peak extracting unit 61, a pair-match/tracking unit 62, a pedestrian likelihood calculating unit 63 and an object selecting unit 64.

Figure 3:
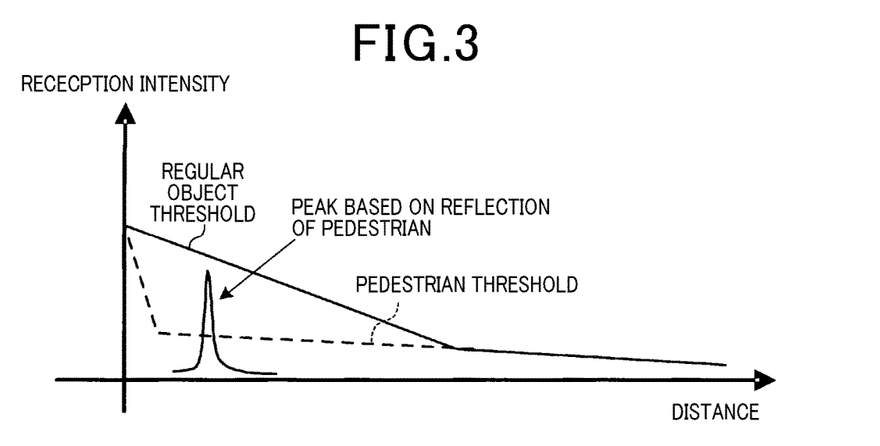
FIG. 3 is an explanatory diagram showing a threshold used for extracting a peak component.

The peak extracting unit 61 extracts a signal component (peak component) representing a peak value in the power spectrum calculated by the FFT unit 3. As shown in FIG. 3, the peak component is extracted using a pedestrian threshold which is lower than the regular object threshold, the peak component having a reception power exceeding the pedestrian threshold and lower than an upper limit of pedestrian threshold where a predetermined value is added to the pedestrian threshold. It should be noted that the peak component is extracted within a region lower than or equal to the pedestrian upper limit frequency, the region being defined considering a moving speed of the pedestrian.

Figure 4A:
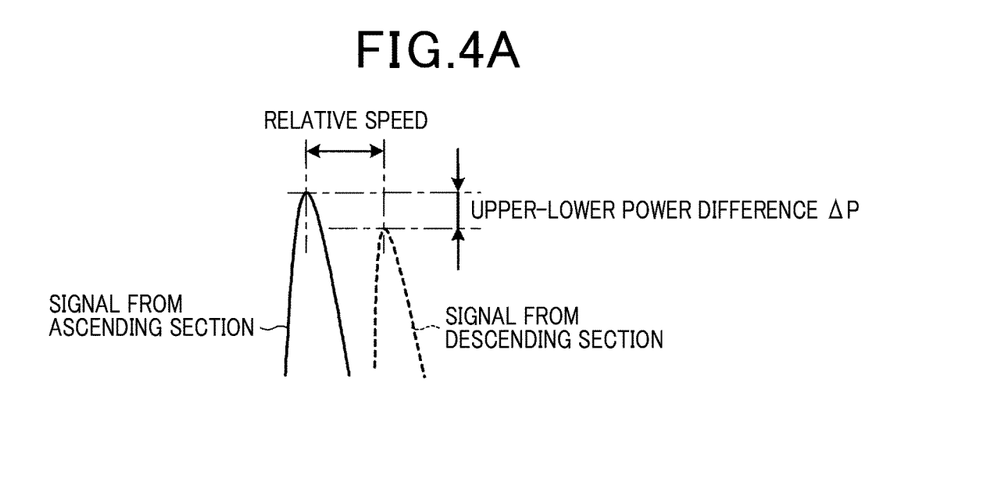
FIG. 4A is an explanatory diagram of a pair matching condition, showing a relationship between an upper-lower power difference of a peak pair and a relative speed.
Figure 4B:
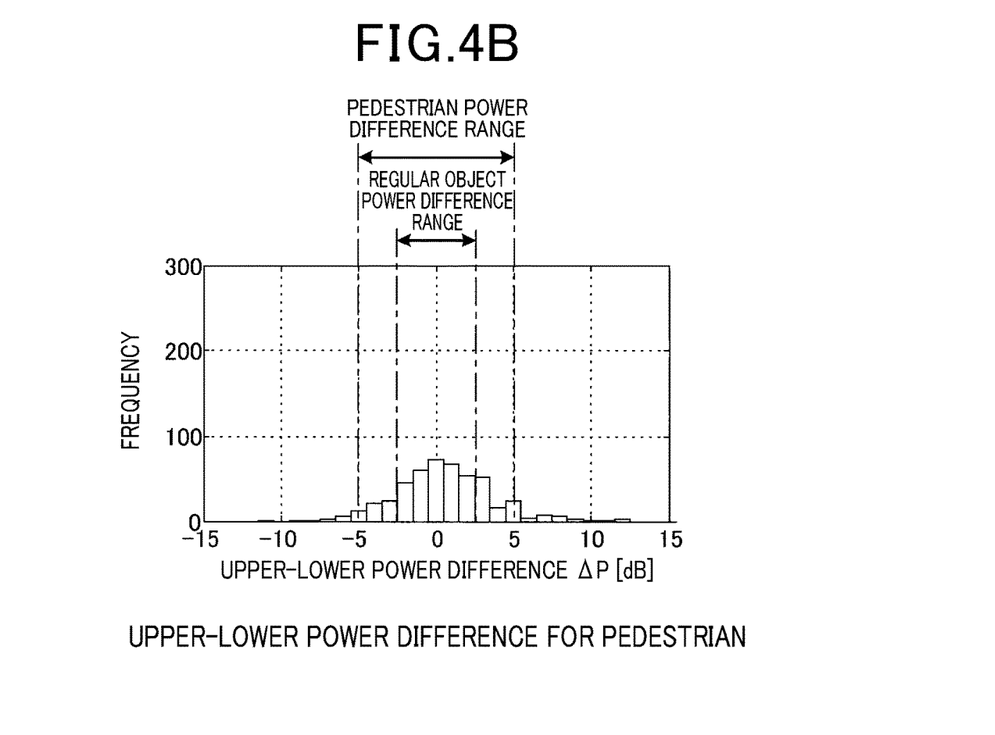
FIG. 4B is an explanatory diagram of a pair matching condition, showing a relationship between a frequency distribution of an upper-lower power difference and a power difference range.

The pair-match/tracking unit 62 determines, similar to the pair match/tracking unit 52, any combination of a peak component in the ascending section and a peak component in the descending section extracted by the peak extracting unit 61 to be a peak pair, and extracts a candidate pair in which both peak components satisfy a predetermined pair match condition. In the pair match condition, for the power difference range, the regular object detection unit 5 utilizes a regular object power difference range which is set based on the feature of the vehicle, and the pedestrian detection unit 6 utilizes a pedestrian power difference range which is set based on the feature of the pedestrian. The regular object power difference range is set using a frequency distribution which is set based on actual measurement result of the upper-lower power difference in accordance with reflected waves from the vehicle (power difference between both peak components composing peak pair). Similarly, the pedestrian power difference range is set based on actual measurement result of the upper-lower power difference in accordance with reflected waves from the pedestrian. As shown in FIG. 4, the pedestrian power difference range is wider than the regular object power difference range.

Figure 5:
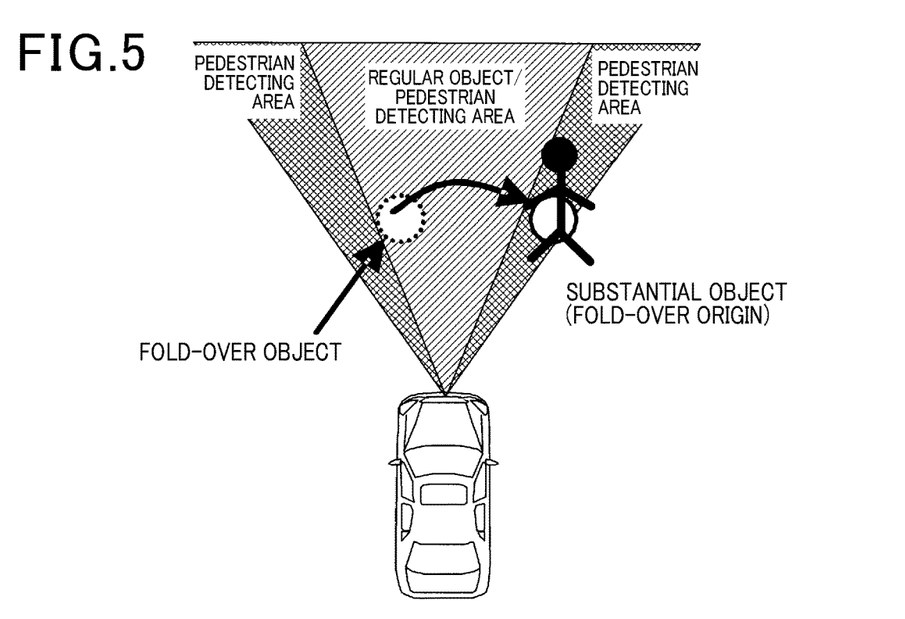
FIG. 5 is an explanatory diagram showing a detection area of a tracking process.

Similar to the pair-match/tracking unit, the pair-match/tracking unit 62 executes a tracking process for extracted candidate pairs. As shown in FIG. 5, the pair-match/tracking unit 52 sets an area where no fold-over of the azimuth occurs to be a regular object detection area, determines a tracking object to be a peak pair existing in the regular object detection area, and removes peak pairs (fold-over object) in which corresponding substantial object exists outside the regular object detection area. On the other hand, the pair-match/tracking unit 62 sets a wide area including an area where fold-over of the azimuth occurs to be a pedestrian detecting area, and tracks objects existing in the pedestrian detection area considering fold-over of the azimuth. The method of removing the fold-over object and the tracking method considering the fold-over of the azimuth are known.

Figure 6:
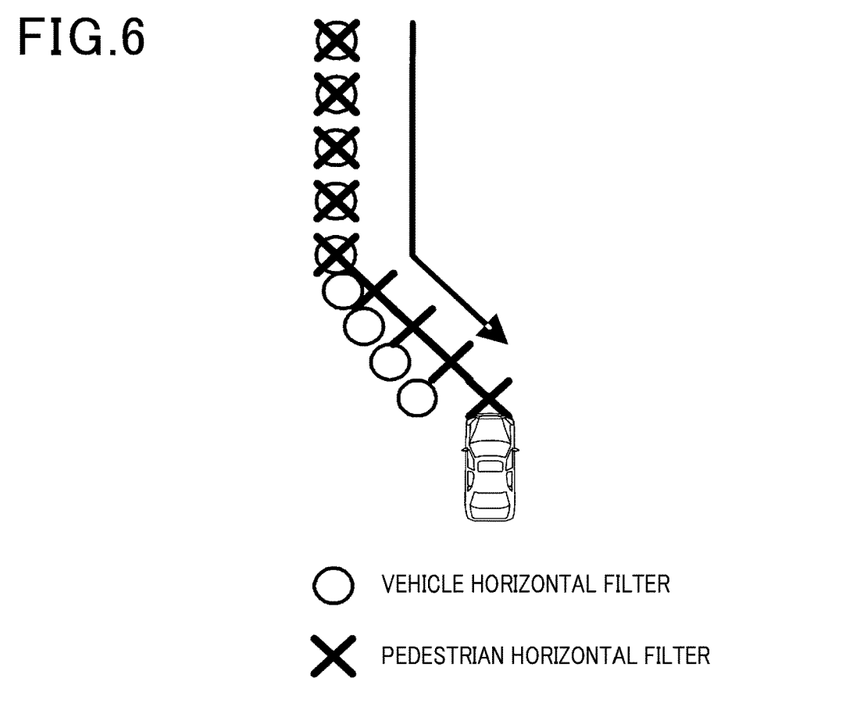
FIG. 6 is an explanatory diagram related to a horizontal position filter.

The likelihood calculating unit 63 determines peak pairs as decided pairs extracted by the pair-match/tracking unit 62 to be objects representing pedestrians, and generates object information (location, ground speed, moving direction or the like). In this case, unlike the vehicle horizontal position filter used for a process in the object extracting unit 53 of the regular object detection unit 5, a pedestrian horizontal position filter is used, which performs lower level filtering. As shown in FIG. 6, for a horizontal position to which the pedestrian horizontal filter is applied (refer to sign 'x' in FIG. 6), compared to a horizontal position to which the vehicle horizontal filter is applied (refer to sign 'o' in FIG. 6), the object approaching the own vehicle can be detected with favorable responsiveness. The pedestrian likelihood calculating unit 63 calculates, based on other information obtained from the object information or peak pairs for each peak pair (for example, power), a pedestrian likelihood in which the value becomes larger as a probability of collision to the own vehicle becomes larger when the object looks like a pedestrian.

The object selecting unit 64 selects, based on calculated pedestrian likelihood calculated by the pedestrian likelihood calculation unit 63, object information about 8 objects in the order of the pedestrian likelihood.

[Effects]

As described above, after the calculation of the FFT and the azimuth using a sampling data of the beat signal, the radar apparatus 1 changes the content of an object recognition process depending on whether the target object is a pedestrian or a regular object other than the pedestrian. The object recognition process is performed utilizing a calculation result of the FFT and azimuth.

Thus, since the object recognition process (peak extraction, pair-match, tracking, object extraction) can be performed for each target object, depending on features of the target object, detection accuracy can be improved for all of the target objects. Further, the radar apparatus 1 avoids extracting unnecessary peak pairs or avoids an increase of processing load. [Other Embodiment]

Embodiments of the present disclosure have been described so far. However, apparently, the present disclosure is not limited to the above-described embodiments and can be modified in various ways.

(1) According to the above-described embodiments, the object recognition process is performed separately for pedestrians and regular objects other than pedestrians (especially vehicle). However, this is not limited thereto. For example, roadside objects or lane markings may be excluded from the regular object, and a dedicated object recognition process may be performed for these objects.

(2) Functions included in an element of the above-described embodiments may be distributed into a plurality of elements, or functions included in a plurality of elements may be integrated to an element. Also, at least part of configurations in the above-described embodiments may be replaced by a known configuration having similar functions. Also, a part of configurations in the above-described embodiments may be omitted. Further, at least part of configurations in the above-described embodiments may be added or replaced to the other configurations in the above-described embodiments. It should be noted that various aspects inherent in the technical ideas identified by the scope of claims are defined as embodiments of the present disclosure.

(3) Other than the above-described object detection apparatus (signal processing unit 26), various modifications can be embodied, including a system provided with the above-described object detection apparatus as an element, a program having a computer serve as the above-described object detection apparatus, a medium having the program stored therein, and an object detection method.

The signal processing unit (3, 4) of the above-described embodiments corresponds to the FFT unit 3 and the azimuth calculation unit 4, the object detection unit (5, 6) corresponds to the regular object detection unit 5 and the pedestrian detection unit 6, and the selection unit (54, 64) corresponds to an object selection unit.

REFERENCE SIGNS LIST

1: radar apparatus
2: data acquiring unit
3: FFT unit
4: azimuth calculation unit
5: regular object detection unit
6: pedestrian detection unit
7: CAN transmission unit
10: oscillator
12, 22: amplifier
14: distributor
16: transmission antenna
20: reception antenna unit
21: reception unit
23: mixer
24: filter
25: A/D converter
26: signal processing unit
51, 61: peak extracting unit
52, 62: pair-match/tracking unit
53: object extracting unit
54, 64: object selecting unit
63: pedestrian likelihood calculating unit

The invention claimed is:

1. An object detection apparatus comprising:
a signal processing unit that performs a frequency analysis of a beat signal obtained by transmitting and receiving continuous waves, and estimates an incoming direction of reception waves; and
an object detection unit executes, based on a processing result of the signal processing unit, at least an extracting process of an object candidate, a tracking process for an object and the object candidate, and an object recognition process that recognizes the object candidate to be the object, wherein the object detection unit comprises at least a first object detection unit and a second object detection unit, the first object detection unit and the second object detection unit each detect different types of objects, the object detection unit executes, individually for each type of object to be detected by the first and second object detection units, a series of processes including the extracting process, the tracking process and the object recognition process, and changes content of the series of processes depending on a feature of the object to be detected.

2. The object detection apparatus according to claim 1, wherein a threshold is used for extracting a peak from a frequency analysis result of the beat signal; and the extracting process changes the threshold depending on reflection intensity of the object to be detected.

3. The object detection apparatus according to claim 1, wherein the extracting process changes, depending on a moving speed of the object to be detected, a target region when extracting a peak from a frequency analysis result of the beat signal.

4. The object detection apparatus according to claim 1, wherein the tracking process changes a tracking area depending on a feature of a moving speed or a moving direction of the object to be detected.

5. The object detection apparatus according to claim 1, wherein the object recognition process determines whether or not a segmentation is necessary depending on a size of the object to be detected.

6. The object detection apparatus according to claim 1, wherein the apparatus further comprises a selection unit that selects an object to be controlled in a driving support control from among objects detected by the object recognition process.

7. The object detection apparatus according to claim 1, wherein the object to be detected includes at least a pedestrian.

8. The object detection apparatus according to claim 1, wherein either the first object detection unit or the second object detection unit includes a pedestrian as the object to be detected.

9. The object detection apparatus according to claim 1, wherein the second object detection unit includes an pedestrian as the object to be detected.

* * * * *